Oct. 2, 1934.        C. OLSON         1,975,699
POPPET VALVE FOR INTERNAL COMBUSTION ENGINES
Filed May 17, 1933

Inventor
Carl Olson.
By L. F. Randolph, Jr.
Attorney

Patented Oct. 2, 1934

1,975,699

UNITED STATES PATENT OFFICE 1,975,699

POPPET VALVE FOR INTERNAL COMBUSTION ENGINES

Carl Olson, Cherry Grove, Oreg.

Application May 17, 1933, Serial No. 671,588

1 Claim. (Cl. 123—188)

The invention relates to an improved construction of poppet valves for internal combustion engines and has for one of its objects the provision of a valve with improved means for supporting the valve spring ring or washer, consisting in the provision of an enlargement at the extremity of the valve stem provided with a flange having a shoulder to support the ring or washer, the ring or washer being of an interrupted type to fit over the small portion of the stem and provided with an opening to receive the larger portion of the stem and hold the ring or washer in fixed position relatively to the stem, the stem being also provided with an enlargement intermediate of its ends providing the slide bearing for the valve, said enlargement being of the same diameter as the shoulder flange so as to permit removal of the valve stem through the slide bearing.

Another object of the invention is the provision of improved means for adjusting the length of the valve stem comprising an axial threaded opening to receive a headed threaded member.

Figure 1:
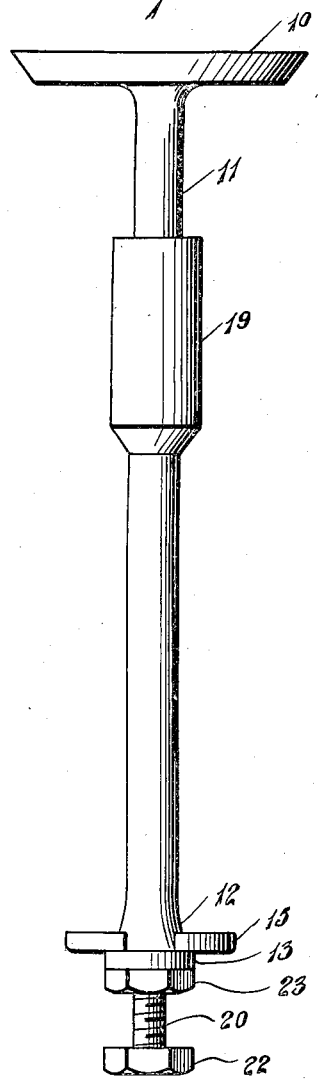
Figure 2:
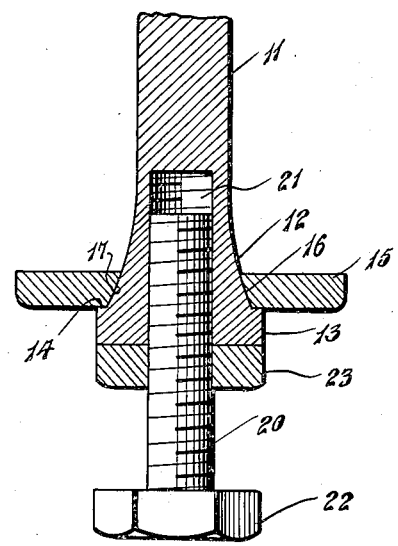
Figure 3:
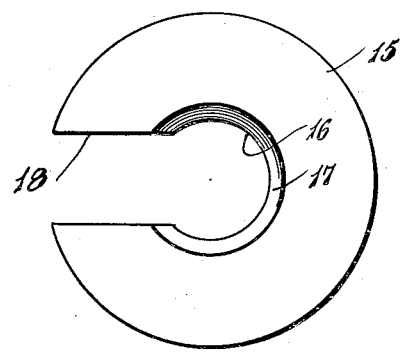

The invention will be described in detail hereinafter and will be found illustrated in the accompanying drawing, in which Figure 1 is a side view in elevation of the improved valve, Figure 2 is a fragmentary view partly in section of the extremity of the valve stem and the ring or washer with the adjusting member in position, and Figure 3 is a bottom plan view of the spring or washer.

In the drawing similar reference characters are used to designate corresponding parts in all of the views.

The improved valve 10 has a stem 11 provided with a gradually increasing enlargement 12 at its extremity, and ending with a flange 13 providing a circumferential shoulder 14 to seat an interrupted washer 15 that is provided with a central opening 16 to snugly fit the enlargement 12, the circumferential wall of the opening 16 being beveled as shown at 17 to engage the tapered enlargement. 18 indicates a radial opening communicating with the opening 16 and of a width corresponding to the diameter of the stem 11 and narrower than the diameter of the opening 16, it being apparent that the washer is mounted on the stem by applying it to the stem through the opening 18 and then permitting the washer or ring to seat on the shoulder 14.

The stem 11 intermediate of the extremity and the valve 10 is provided with an enlargement 19 of the same diameter as the flange 13, this enlargement 19 providing the slide bearing for the valve and its stem, and by having the parts 19, 13, 22 and 23 of the same diameter it will be apparent that the valve stem may be removed through the bearing in the engine block for the valve. The nut 23 is octagon in shape, having eight sides to enable necessary adjustments to be made to the nut. The ring 15 is provided to support the valve spring usually employed in poppet valves to maintain the valve normally in a closed position.

In order to take up the wear on the valve 10 and to compensate therefor, I provide an adjustable tappet member mounted in the end of the stem and consisting of a screw or threaded bolt 20 engaging in a threaded socket 21 arranged axially of the stem 11, said screw or bolt having a polygonal head 22 for adjustment of the screw or bolt. 23 designates a jam nut mounted on the screw or bolt 20 and serving to lock the screw or bolt in adjusted positions.

What is claimed is:—

A valve assembly, comprising a valve having a stem, an enlargement on said stem intermediate of its ends providing a bearing therefor, a flange on the free end of the stem of substantially the same diameter as the enlargement whereby the valve and stem is removable through the bearing of the stem, a circumferential shoulder on said flange, the stem adjacent to said flange tapering from the flange to the stem, and a washer for supporting a spring seated on said shoulder having a central opening with a beveled circumferential wall to engage the tapered portion aforesaid, and a radial opening communicating with the central opening to receive the valve stem above the tapered portion for removal and replacement of the washer relatively to the stem and shoulder.

CARL OLSON.